UNITED STATES PATENT OFFICE.

PEARIS B. ELLIS AND ALBERT Y. WERNER, OF CARSON CITY, NEVADA.

SUBSTITUTE FOR RUBBER AND PROCESS OF PRODUCING SAME.

SPECIFICATION forming part of Letters Patent No. 685,038, dated October 22, 1901.

Application filed May 16, 1901. Serial No. 60,579. (Specimens.)

*To all whom it may concern:*

Be it known that we, PEARIS B. ELLIS and ALBERT Y. WERNER, residing at Carson City, in the county of Ormsby and State of Nevada, have invented certain new and useful Improvements in Substitutes for Rubber and Process of Producing Same, of which the following is a specification.

This invention relates to a method of producing a substitute for india-rubber from the common greasewood, (*Chrysothamnus* or *Begelovia*.) This plant in several varieties is found on the eastern slope of the Rocky Mountains and on the arid plains of the western portion of the United States. Some varieties of the young plant have a woolly covering of the bark, which generally disappears as the bush matures. The young wood has a milky sap and the old wood a resinous gum, which is soluble in carbon disulfid and in other known hydrocarbon solvents of rubber. As this shrub never reaches the proportions of even a small tree and as the flow of sap from the young shrub is very small, while the old shrub does not yield its juices when tapped, we have been unable to obtain quantities of the gum in its natural state previous to solution wherewith to experiment and are unable to describe the characteristics of the said gum before solution.

We take the plant, and preferably the matured shrub, and bruise the stalks by passing the same between rollers. This loosens or breaks the bark and crushes the woody fiber of the larger stems. The whole mass is then inclosed in a close vessel, mechanically agitated, and exposed to the action of carbon bisulfid, carbon disulfid, naphtha, or other known solvent of india-rubber. If desirable, the temperature may be raised to something like 115°. The vessel in such case must be strong enough to resist the pressure. After exposure for some hours to the action of the solvent the liquid is strained off. The stalks may be pressed to extract the residual liquid, which, like the extract, is a gum dissolved in the solvent. The liquid solvent and contained gum are then placed in a closed vessel and the volatile solvent driven off by heat. The volatile solvent is condensed in a worm or condenser and may be reused. The gummy mass, which will not volatilize in the still or receiver, is then washed in water, either warm or hot, and is then subjected to repeated rollings. The gum resulting is of a brown color, highly flexible and elastic, is combustible, and seems to possess the characteristics of india-rubber, except that it has rather a balsamic odor, differing from the odor of the rubber of commerce. The gum may be vulcanized by the addition of a quantity of sulfur in the same manner as can the india-rubber of commerce.

What we claim is—

1. The method of extracting gum from shrubs of the *Chrysothamnus* or *Begelovia* family, which consists in bruising the stalks of the shrub, exposing to the action of a hydrocarbon solvent, withdrawing the liquid, and expelling the volatile solvent by distillation, substantially as described.

2. The method of preparing gum from the shrubs of the *Chrysothamnus* family, which consists in bruising the woody stalks, dissolving the gum therefrom by the action of a volatile hydrocarbon solvent, driving off the solvent by distillation, and washing and working the non-volatile residuum.

3. The method of preparing a rubber-like gum from the stems of the shrub *Chrysothamnus* or *Begelovia*, (vulgar, greasewood of the American desert) which consists in bruising the stalks of the plant, then treating said stalks with carbon disulfid in a closed vessel at about 115° Fahrenheit, then withdrawing the liquid and driving off the volatile portion by heat, retaining the gum, as described.

4. The rubbery substance described, consisting of an elastic flexible gummy residuum remaining after dissolution of the gum of the *Chrysothamnus* shrub with a volatile solvent, and the expulsion of the volatile portion of the extract, substantially as described.

In testimony whereof we affix our signatures in presence of two witnesses.

PEARIS B. ELLIS.
ALBERT Y. WERNER.

Witnesses to signature of P. B. Ellis:
  ED. P. JAMES,
  ALBERT FOLEY.
Witnesses to signature of A. Y. Werner:
  ROBERT GRIMMON,
  J. N. HILL.